US005931098A

United States Patent [19]
Bates

[11] Patent Number: 5,931,098
[45] Date of Patent: Aug. 3, 1999

[54] ROBOT MOUNTED PRINTHEAD

[75] Inventor: Christopher Michael Bates, Northants, United Kingdom

[73] Assignee: Willett International Limited, United Kingdom

[21] Appl. No.: 08/981,435

[22] PCT Filed: May 2, 1997

[86] PCT No.: PCT/IB97/00478

§ 371 Date: Mar. 12, 1998

§ 102(e) Date: Mar. 12, 1998

[87] PCT Pub. No.: WO97/42086

PCT Pub. Date: Nov. 13, 1997

[30] Foreign Application Priority Data

May 3, 1996 [GB] United Kingdom .................. 9609379

[51] Int. Cl.[6] .............................. B41F 17/24; B25J 18/02

[52] U.S. Cl. .......................... 101/484; 101/483; 101/486; 101/43; 901/27

[58] Field of Search ............................ 101/43, 494, 483, 101/484, 486; 395/82, 83; 901/27

[56] References Cited

U.S. PATENT DOCUMENTS

| | | | |
|---|---|---|---|
| 3,463,329 | 8/1969 | Gartner | 414/627 |
| 4,092,204 | 5/1978 | Wesley | 156/481 |
| 4,115,684 | 9/1978 | Linbom | 219/124.22 |
| 4,745,857 | 5/1988 | Putnam et al. | 101/44 |
| 4,844,947 | 7/1989 | Kasner et al. | 427/510 |
| 5,221,405 | 6/1993 | Trouteaud | 156/364 |

FOREIGN PATENT DOCUMENTS

| | | |
|---|---|---|
| 534337 | 9/1992 | European Pat. Off. . |
| 96/00685 | 1/1996 | WIPO . |

*Primary Examiner*—Ren Yan
*Assistant Examiner*—Daniel J. Colilla
*Attorney, Agent, or Firm*—Charles D. Gunter, Jr.

[57] ABSTRACT

The present invention relates to a mechanism for and method of applying labels, printing images, or scanning a feature on the surface of a substrate. The mechanism (1) comprises a read/write/apply means (4) for reading, writing or applying the information, carried and located relative to a predetermined position by a robotically actuated device. The device comprises a mounting member (5), a support member (6) relatively movable with respect to the mounting member (5) and carrying the said means (4), and at least three pairs of extendable arms (7,8,9) extending between and pivotally mounted on the members (5,6). The arrangement is such that one arm in each of said pairs of arms (7,8,9) cooperates with an arm from another pair of arms. Extension and/or retraction of the arms (7,8,9) causes movement and/or rotation of the support member (6) relative to the mounting member (5), whereby the said means (4) may be located relative to the predetermined position.

15 Claims, 1 Drawing Sheet

ROBOT MOUNTED PRINTHEAD

Figure 1:
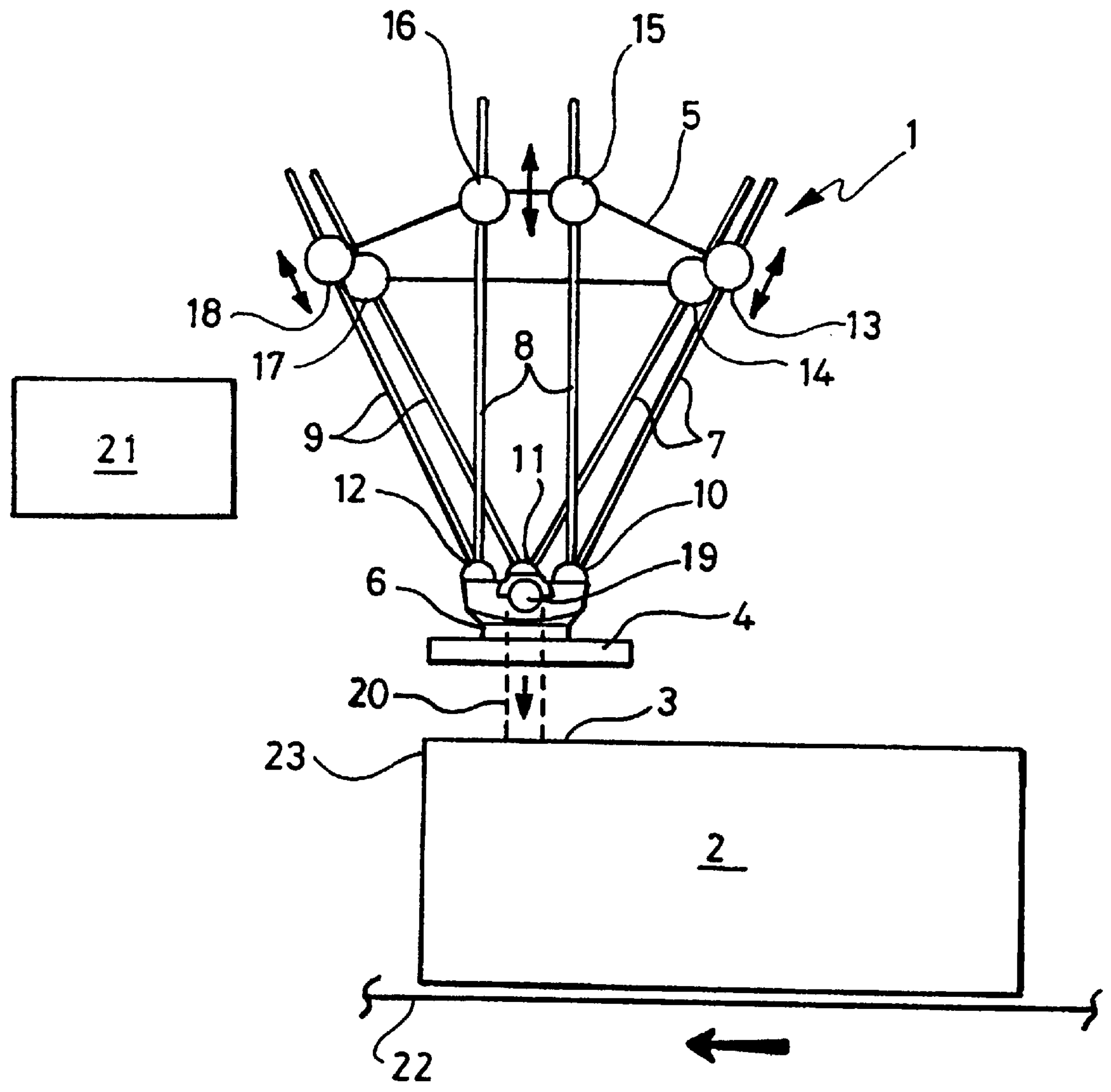

The present invention relates to a mechanism and method, notably to a robot mounted label applicator, print head or scanning device and its use in applying labels or printing images onto a substrate or in scanning or reading a feature on the surface of a substrate, such as a planar face of a product or on a pallet load of articles.

Ink jet, hot foil and other printers are used to mark alphanumeric, quality control characters or other images on a wide range of substrates. In the packaging of products, it is commonplace to group together groups of a product on a pallet and to form a unitary load by shrink wrapping those products in place upon the pallet for transport and storage. However, it is desirable to apply a printed label or the like to the unitary load so as to identify the products on that particular pallet and their destination. This is commonly done be applying a suitable bar code or other image to the label using an ink jet printer, hot foil or other printer, and then applying that pre-printed label to the pallet. However, due to mis-identification of the pallet and its contents by an operator, the label may be incorrectly printed or the correctly printed label may be applied to the wrong pallet. Furthermore, problems subsequently arise in the scanning of manually applied labels due to the variation in position and orientation of the labels upon the pallet.

In order to reduce the errors due to manual application of the label and its information, it would be desirable to apply the information to a label already carried by the pallet or to apply a specific pre-printed label to the pallet and to control the information printed on that label by means of a computer which can be interlinked with means identifying the products carried by that specific pallet and its destination.

Problems are encountered with such a concept in that the position of the label on the pallet can vary, for example due to manual mis-placement of the label or movement of the label with any shrink-wrapping of the plastic film to which the label has been applied, and creasing or distortion of the label may occur during placement upon the pallet. These problems can be reduced where the products are of uniform size and shape and the shrink wrapped pallet present a consistent shape and size of face to the label applicator mechanism. However, where the pallet and/or the product is not uniformly shaped and sized, variations in the position of the label give rise to problems which have as yet not been solved. As a result, it has not proved practical to print information, for example bar codes, onto blank labels which have been pre-applied to a pallet load of products or other substrate whose shape can vary from one product item to the succeeding item.

Where the information is applied to a blank label which it then applied to the product or pallet, it is necessary to apply that label accurately to enable subsequent scanning of that label to be carried out mechanically. Similar problems to those encountered with printing onto a blank pre-applied label arise.

The above problems are accentuated where pallets or products of different sizes and shapes succeeding one another on a packaging line are to be labelled and no cost-effective method has yet been devised to achieve this.

We have now devised a method and device by which such printing of pre-applied labels can be achieved despite changes in the position of the label upon the pallet or by which a label can be applied to an accurately determined position on the pallet enabling that label to be scanned by conventional means in its subsequent transport and storage. The invention makes it possible to apply labels carrying a large amount of information to a moving pallet in a product/packaging line so that an individual pallet carrying a range of products can be traced throughout its transport and storage. This makes it possible to organise the transport, storage and identification of that pallet using computers, thus substantially eliminating human error.

The invention can also be applied to labelling products or pallets whose size and shape or the composition of the mix of products on the pallet varies from one pallet or product to the next. Since the label can be accurately positioned, subsequent scanning of the label is facilitated. Alternatively, the invention can be applied to the scanning to enable labels located at diverse positions on a product or pallet to be scanned mechanically, thus reducing the problems encountered with manual placement of labels on the product or pallet.

Accordingly, the present invention provides a mechanism for reading from, and/or for writing to, and/or for applying on, a substrate, machine readable information at a predetermined position on the surface of the substrate, comprising: read/write/apply means for reading, writing or applying the information; a robotically actuated device which carries the read/write/apply means and which may locate the read/write/apply means relative to the predetermined position; characterised in that the device comprises a mounting member, a support member relatively movable with respect to the mounting member and which carries the read/write/apply means, and at least three pairs of arms extending between the mounting member and the support member, the arrangement being such that:

i) one arm in each of said pairs of arms cooperates with an arm from another pair of arms;

ii) the arms in each of said pairs of arms are independently connected to the support and mounting members by attachment means which permit the arms to pivot with respect to the said mounting and support members; and iii) the arms are provided with means for varying the lengths of the arms relative to one another whereby relative extension or contraction of an arm with respect to the other arm in its pair, and/or with respect to one or more arms in other pairs, causes movement and/or rotation of the support member relative to the mounting member, whereby the read/write/apply means may be located relative to the predetermined position.

The substrate may be any external surface of an item to which the read/write/apply means is relatively located. For example, the substrate may be a sheet of shrink-wrap film, a cardboard box, or a label on an underlying substrate.

The machine readable information may be in the form of an image, text, bar code or any other code suitable for handling by machine.

The read/write/apply means may be an information writing device, for example a write means or a write-only means, that may write or print an image, text or bar code at a desired location on the substrate.

Alternatively, or additionally, the read/write/apply means may be an information application device, for example an apply means or an apply-only means, that may be adapted to apply a pre-written or pre-printed label to a desired location upon the substrate. If the read/write/apply means is also an information writing device, such pre-written information may be written or printed by the read/write/apply means prior to the application of the label on the substrate. However, the pre-written information may be written or printed in some way, for example by hand or by any other means.

The read/write/apply means may, however, additionally or alternatively be an information scanning device, for example a read means or a read-only means, that may scan the image, text or bar code at a desired location on the substrate. Examples of information scanning devices include optical character or bar code readers, for example using visible or infrared light emitting diodes, and solid state or HeNe lasers.

The read/write/apply means may also combine any of the read, write or apply functions described above so, for example, the read/write/apply means may write or print the information on a first substrate, for example a label, then optionally apply the label to a second substrate, for example palletised goods, and then optionally read or scan a label, either the label applied and/or written by the read/write/apply means, or another label.

Preferably, the read/write/apply means may be moved/rotated to more than one predetermined position, for example on one or more sides of a substrate, or different substrates on different sides of, for example, a product.

The support member and/or the mounting member may be essentially planar, in which case the attachment means may permit the arms to pivot independently of one another with respect to the planes of the mounting or support members.

Preferably, the movement and/or rotation of the support member relative to the mounting member allows the read/write/apply means to be controlled within a certain volume of space in all three dimensions so that the read/write/apply means may be more conveniently placed in a desired orientation in register with a desired location on the substrate.

The invention also provides a method for reading from, and/or for writing to, and/or for applying on, a substrate, machine readable information at a predetermined position on the surface of the substrate, using a mechanism according to the invention described herein, the method comprising the steps of:

a) varying the lengths of the arms relative to one another so that the mounting member is moved and/or rotated relative to the mounting member, whereby the read/write/apply means is located relative to the predetermined position; and b) using the read/write/apply means to read from, and/or to write to, and/or to apply on, a substrate, the machine readable information at the predetermined position on the surface of the substrate.

When the read/write/apply means is an information scanning device, the mechanism allows the read/write/apply means to be positioned in register with information already applied to the substrate, for example a label carried by a product or pallet, or in register with the desired locus on the surface of the substrate to which the information is to be applied, for example to locate an apply means such as a label applicator with respect to the product or pallet to apply the pre-printed or plain label at the desired position or to print information on the substrate or on a pre-applied blank label.

For convenience, the invention will hereinafter be described in terms of printing an image upon a label which has already been applied to a shrink wrapped group of products on a pallet.

By mounting the print head upon the mounting member of the robotically actuated device, the print head can be aligned with the label upon each pallet so as to accommodate variations in the location and/or orientation of the label between successive pallets. The problems associated with incorrect location of the label on the pallet can thus be reduced.

Sensor means may be provided so that the mechanism may be brought into proximity with the predetermined position on the surface of the substrate.

The position of the label on each pallet can then be located by suitable sensor means, which then determine the relative lengths of each of the arms required to bring the print head into register with the label. However, where the blank label has been applied by a mechanism of the invention, the computer data used to control the positioning of that label can also be used to control the operation of the mechanism carrying the print head so that the label application and printing devices are operated in register with one another. Alternatively, where the mechanism is the first in a series of operations on the pallet, the computer data can be derived from a suitable program which may be triggered by one or more sensors detecting the position and/or shape of the pallet. The use of such computer data to control the operation of the mechanism enables the mechanism to accommodate changes in the shape and size of successive pallets of products. Furthermore, such data can be handed on to subsequent mechanisms carrying out operations on the pallet so as to daisy chain a sequence of operations and thus minimise human errors in that series of operations.

For convenience, the invention will hereinafter be described in terms of the use of a computer program triggered by a sensor means such as a proximity, photocell or other detector which detects when the pallet is in register with the robotically controlled printing mechanism.

The print head can be of any suitable type, for example a drop on demand, continuous jet or impulse jet printer, a thermal transfer or hot foil printer or a stamp type printer.

For convenience, the invention will hereinafter be described in terms of the use of an ink jet printer.

The use of an ink jet printer enables the nature of the image, bar code or other information to be printed upon the label to be varied rapidly, thus enabling different information to be printed upon successive labels further enhancing the benefits of flexibility in operation of a production line or packaging line achieved by use of the present invention.

The print head is mounted upon the robotically moved support member, which is typically a flat support plate or the like, but which may take any suitable form having regard to the environment within which the print head is to be moved and the design and construction of the print head.

For convenience, the invention will hereinafter be described in terms of a simple triangular support plate carrying a conventional drop on demand print head bolted or otherwise secured to it so that the droplets ejected from the print head travel normal to the plane of the support plate.

However, if desired, the droplets can travel parallel to the plane of the support plate or at any angle thereto.

The robotic device preferably comprises three or more pairs of extensible and contractible arms extending from symmetrically located mounting points about the edge of the mounting member and extending to similarly disposed mounting points on the support member carrying the print head. The support and mounting members are preferably of a polygonal plan shape having the same number of corners as there are pairs of arms. For example, a three pair of arms mechanism will have triangular plan shaped mounting and support members, with each pair of arms being attached at or adjacent a corner thereof. One arm in each pair will cooperate with one of the arms from another pair of arms, which need not be an arm from an adjacent pair of arms. However, it is preferred that one arm in each pair cooperates with an arm from the adjacent pair of arms.

Thus, with the support and mounting members having a triangular plan shape, with the corners of the triangles generally in register with one another, one arm of the pair will extend from a corner of the mounting member to the corner of the support member above it. The other arm of that pair will extend to the corner next adjacent and so on. Thus each corner of the support member will be connected to the corner of the mounting member below it and to the next clockwise or anticlockwise corner of the mounting member. Where more than three pairs of arms are present, the arms may extend in a similar configuration.

Uniform extension of the arms will carry the support plate away from the mounting member and contraction of the arms will carry the support plate towards the mounting member. If only one or two of the arms are extended or contracted, or the rate of extension or contraction of the arms differs, the support plate will be tilted and/or the line of travel of the support plate can be inclined in the x, y and z axes relative to the plane of the mounting member.

In this manner it is possible to vary the position of the support plate and the print head it carries relative to the mounting member in all three dimensions and to cause the plane of the members to be inclined or rotated to one another. The mounting of the print head to the support plate and/or of the mounting member can also incorporate a rotary mounting allowing more complex changes in attitude of the head with respect to the pallet surface.

For convenience, the invention will hereinafter be described in terms of a fixed mounting member and a print head which has a fixed orientation with respect to the support member.

The arms can be extended and contracted independently of each other by any suitable means, for example by being in the form of hydraulic rams or other forms of telescopic construction. Alternatively, the arms can be extended or contracted by means of hydraulic or electrical motors driving screw or ratchet type means for moving the arms relative to the support and/or the mounting member. It is preferred to extend or contract the arms by means of screw drive mechanisms driven by stepper or other forms of electric motors. By suitable selection of the pitch of the screw thread of the drive mechanism, the degree of accuracy of positioning of the print head can be selected.

The arms are conveniently attached to the support and the mounting members by means of universal joints, for example a ball and socket type of attachment, so that the arms can move relative to the plate and member through a large degree of angular displacement as well as varying in length. Typically, it is preferred that the attachment means allow the arms to travel freely within a cone having an included angle of from 60° to 120°. In a particularly preferred form of the robotic device for present use, the arms are attached to the mounting member by means of ball and socket attachments which incorporate the drive mechanism for extending or contracting the arms.

A particularly preferred form of the robotic device for present use is a three axis parallel arm configuration, for example a Clavel Delta device with three pairs of variable length struts, each pair lying along one of the three axes. Such mechanism are commercially available, for example being manufactured by Geodetics Limited in England, and are known as "hexapod" robots.

Such a form of support for the print head provides a very simple and robust means for varying the position and orientation of the print head relative to the pallet, thus enabling the printer to accommodate variations in the placement and orientation of labels carried by a pallet. Whilst other forms of robotic device for the print head could have been employed, the majority of such robotic devices would be excessively cumbersome and expensive for use in a label printing application. Furthermore, we have found that the above form of robotic device is surprisingly responsive to requirements for rapid and extensive changes in position and orientation of the print head, enabling rapid re-alignment of the print head with labels on successive pallets where there are large variations in the position and/or orientation of the label upon the pallet. Furthermore, we have found that such forms of robotic device are surprisingly accurate in their orientation and positioning of the print head enabling fine print images to be produced at accurately determined positions on the label, thus enabling bar coding and other fine and complex images to be printed and scanned reproducibly.

The robotic device positions the print head carried by its support plate to register with the label upon which an image is to be printed. As indicated above, the position of the label can be determined by suitable optical or other sensors which serve to control the operation of the motor(s) extending or contracting one or more of the arms of the robotic device. However, the robotic device may comprise means to determine positional data related to the extension of each of the arms. Therefore, it is preferred to apply the blank label using a mechanism of the invention and to use the positional data obtained during that operation to position the print head for the printing operation described above.

The invention has been described above in terms of a static mechanism with the product or pallet moving past the mechanism. However, it is within the scope of the present invention for the mechanism to follow the travel of the product or pallet by suitable operation of the arm extension of contraction means so that the print head is able to apply information to the surface of the product or pallet for longer time periods. It is thus possible to apply more information than has hitherto been possible with a fixed position print head. Furthermore, since the print head can be moved in three dimensions, the print head can be used to apply print or other images over areas of the package or other substrate extending in all three planes.

Thus, the device of the invention can be used to print information on all exposed faces of a package at different locations on each face and the information on each face can be different. Alternatively, the device can apply images which extend from one face onto another, for example where a decorative image is applied to a package.

As indicated above, the invention can also be applied to the application of blank or pre-printed labels to an article, for example a carton or a pallet load of cartons. In this case, the support member carries a label application device and the label can be applied to an accurately determined point on any desired face or faces of the article so that subsequent scanning of that label is facilitated. If desired, the label can be applied blank using the mechanism of the invention and an image then printed on that label using a print head carried by robotic mechanism of the invention so that any movement of the label after initial application, for example due to heat shrinkage of an outer wrapper, can be accommodated and the image printed accurately upon the label. Scanning of the image can also be carried out using a scanning means carried upon the support member in place or the print head described above. In this way any movement of the label or other image or information applied to the product or pallet after application will not affect the accuracy of the subsequent printing of the image and its scanning.

The invention will now be described by way of example, with reference to the accompanying drawing, in which:

FIG. 1 is a schematic representation of a mechanism according to the invention, used to apply printed labels onto a pallet.

FIG. 1 shows schematically part of a mechanism 1 for applying on a substrate, here a shrink wrapped pallet 2, machine readable information at a predetermined position 3 on the shrink wrapped surface of the pallet 2.

The mechanism comprises means for applying the information in the form of an application head 4 which is carried by a robotically actuated device. The device may locate the application head 4 relative to the predetermined position 3 on the pallet 2.

The robotically actuated device comprises a planar mounting member 5, and a planar support member 6 relatively movable with respect to the mounting member 5 and which carries the application head 4. Extending between the mounting 5 and support 6 members are three pairs of strut-like arms 7,8,9. Each pair of arms is parallel and defines an axis, the three axes lying on, or close to, the surface of a cone, the apex of which is directed at the substrate on which the label is to be applied.

The mounting and support members 5,6 are each roughly equilateral triangular in shape, the pair of arms 7,8,9 being pivotably connected to the members 5,6 at the corners of the triangles. The connection to the support member 6 is by means of three pairs of ball and socket joints 10,11,12. Each pair of ball and socket joints allows two arms, from adjacent pairs of arms, to pivot independently of each other. In this way, one arm in each of the pairs of arms 7,8,9 cooperates with an arm from another pair of arms.

Each of the six arms 7,8,9 passes through an aperture in a ball of a second set of six ball and socket joints 13–18. A motor and gearing arrangement (not shown) is provided so that each arm may be extended and retracted through the corresponding ball 13–18. The extension of each arm 7,8,9 may be independently controlled, and as the arms are extended and/or retracted, each arm 7,8,9 will, in general, pivot with respect to the first set of ball and socket joints 10,11,12. Although the two arms connected at the corners of the support plate 6 may pivot independently of each other, the degree of pivot will depend on the retraction and/or extension of the other arms 7,8,9.

The support plate 6 may have a position sensor 19, here an optical position sensor, which may be used to detect the proximity of the shrink-wrapped surface of the pallet 2 with a beam of optical radiation, for example from an infra red LED, here shown in dashed outline 20.

In this way, the position of the label application head 4 may be controlled in three dimensions within a certain volume of space.

The mounting plate 5 will, in general be connected to part of a larger fixture, and although not illustrated in the drawing, this may comprise a computer and associated electronics for controlling the position of the application head 4. In the present example, the location of the mechanism 1 is fixed, but it would be possible for the mechanism itself to have some degree of freedom of movement, for example, linearly along the direction of a production line or conveyor belt, so that the pallet did not have to be stationary during the operation of the robotic device.

The operation of the mechanism 1 in placing a label on the pallet 2 will now be described. A separate label printer 21 is provided close to the robotic device, such that a label may be printed and picked up from the printer 21 by the application head 4. The label is not shown, but may have a self-adhesive backing which is held face outwards by the application head. The pallet 2 may then be moved into position, for example, by a conveyor belt 22, which is controlled in tandem with the mechanism 1. The sensor 19 may detect the predetermined position, for example with reference to an edge 23 of the shrink-wrapped pallet. The conveyor may then be automatically stopped, whereupon some or all of the arms 7,8,9 may be extended to bring the application head 4 into contact with the predetermined position 3 to place and adhere the label to the pallet 2.

After this, the arms 7,8,9 may be retracted to withdraw the application head 4 way from the pallet, whereupon the conveyor 22 may be reactivated to move the pallet 2 away from the mechanism 1.

The invention has been described above in terms of the use of a robotic device to accommodate variations in the location and/or orientation of labels to be placed on a pallet of products. However, it will be appreciated that it is within the scope of the present invention to mount a print head upon the support plate so that the device can be used to print one or more images upon one or more faces of a body whose position and/or orientation varies, for example an outlined area on a carton wall travelling on a conveyor where the size of the carton may vary. The position and/or orientation of the images on the body may also vary from one body to the next.

It is also within the scope of the present invention to mount a scanning device upon the support plate, either in addition or in place of the print head, so that the device can be used to scan images upon a body, the position and/or orientation of the images on the body varying from one body to the next. Such use of a robotically mounted scanning device enables an opto-electronic scanner to be used to detect fine detailed features on a wide range of products which would otherwise have required accurate positioning of those features with respect to the scanner in order for the features to be consistently recognised.

The invention thus provides a method for accurately applying printed images to articles at positions which can be individually determined for each article in a moving stream of articles and to scan complex images on those articles. The invention thus makes it possible to identify individual articles, for example pallet loads of goods, at their point of origination and to apply images carrying more data about the products than had hitherto been considered practical due to limitations in applying accurate images at varying positions on the products.

An individual product or group of products can then be tracked through storage and transport to the end user site by means of the data contained in the applied image, so enabling automation of the product(s) handling to be achieved. At the end-user site, the contents of the product or group of products can be verified by scanning the data on the printed image, and that data entered into a stock control system. Since the image is accurately positioned upon the label or the like on the product, errors in scanning the data are reduced.

I claim:

1. A mechanism for reading from, and/or for writing to, and/or for applying on, a substrate, machine readable information at a predetermined position on the surface of the substrate, comprising:

read/write/apply means for reading, writing or applying the information;

a robotically actuated device which carries the read/write/apply means and which may locate the read/write/apply means relative to the predetermined position;

characterised in that the device comprises a mounting member, a support member relatively movable with respect to the mounting member and which carries the read/write/apply means, and at least three pairs of arms extending between the mounting member and the support member, the arrangement being such that:

i) one arm in each of said pairs of arms cooperates with an arm from another pair of arms;

ii) the arms in each of said pairs of arms are independently connected to the support and mounting members by attachment means which permit the arms to pivot with respect to the said mounting and support members; and iii) the arms are provided with means for varying the lengths of the arms relative to one another whereby relative extension or contraction of an arm with respect to the other arm in its pair, and/or with respect to one or more arms in other pairs, causes movement and/or rotation of the support member relative to the mounting member, whereby the read/write/apply means may be located relative to the predetermined position.

2. A mechanism as claimed in claim 1, in which the support member is essentially planar, the attachment means permitting the arms to pivot independently of one another with respect to the plane of the support member.

3. A mechanism as claimed in claim 2, in which the mounting member is essentially planar, the attachment means permitting the arms to pivot independently of one another with respect to the plane of the mounting member.

4. A mechanism as claimed in claim 1, in which the movement and/or rotation of the support member relative to the mounting member allows the read/write/apply means to be controlled within a certain volume of space in all three dimensions.

5. A mechanism as claimed in claim 1, in which the mechanism comprises a sensor means so that the mechanism may be brought into proximity with the predetermined position on the surface of the substrate.

6. A mechanism as claimed in claim 1, in which the support and mounting members are of a polygonal plan shape having the same number of corners as there are pairs of arms.

7. A mechanism as claimed in claim 1, in which the arms are attached to the mounting member by means of ball and socket attachments which incorporate the means for independently varying the lengths of the arms relative to one another.

8. A mechanism as claimed in claim 1, in which the robotic device comprises means to determine positional data related to the extension of each of the arms.

9. A mechanism as claimed in claim 1, in which the read/write/apply means is an information writing device.

10. A mechanism as claimed in claim 1, in which the read/write/apply means is an information application device.

11. A mechanism as claimed in claim 1, in which the read/write/apply means is an information scanning device.

12. A method for reading from, and/or for writing to, and/or for applying on, a substrate, machine readable information at a predetermined position on the surface of the substrate, the method comprising the steps of:

a) providing a mechanism for reading from, and/or for writing to, and/or for applying on, a substrate, the mechanism including a read/write/apply means for reading, writing, and applying the information; a robotically actuated device which carries the read/write/apply means and which may locate the read/write/apply means relative to the predetermined position characterized in that the device comprises a mounting member, a support member relatively movable with respect to the mounting member and which carries the read/write/apply means, and at least three pairs of arms extending between the mounting member and the support member, the arrangement being such that:

i) one arm in each of said pairs of arms cooperates with an arm from another pair of arms;

ii) the arms in each of said pairs of arms are independently connected to the support and mounting members by attachment means which permit the arms to pivot with respect to the said mounting and support members; and iii) the arms are provided with means for varying the lengths of the arms relative to one another whereby relative extension or contraction of an arm with respect to the other arm in its pair, and/or with respect to one or more arms in other pairs, causes movement and/or rotation of the support member relative to the mounting member, whereby the read/write/apply means may be located relative to the predetermined position;

b) varying the lengths of the arms relative to one another so that the mounting member is moved and/or rotated relative to the mounting member, whereby the read/write/apply means is located relative to the predetermined position; and c) using the read/write/apply means to read from, and/or to write to, and/or to apply on, a substrate, the machine readable information at the predetermined position on the surface of the substrate.

13. A method as claimed in claim 12, comprising before step b) the step of:

d) using the read/write/apply means to write to a first substrate, the machine readable information at the predetermined position on the surface of the first substrate; then step c) comprising applying on a second substrate the machine readable information at the predetermined position.

14. A method as claimed in claim 1, in which the mechanism comprises a sensor means so that the mechanism may be brought into proximity with the predetermined position on the surface of the substrate, the method comprising the step of:

d) using the sensor means to detect the proximity of the substrate.

15. A method as claimed in claim 12, in which the robotic device comprises means to determine positional data related to the extension of each of the arms; the method comprising the step of:

e) applying a label to the substrate;

f) determining the positional data from the extension of each of the arms; and g) using the positional data to position a print head relative to the predetermined position on the surface of the substrate.

* * * * *